United States Patent [19]

Mang et al.

[11] Patent Number: 5,243,876

[45] Date of Patent: Sep. 14, 1993

[54] CABLE ASSEMBLIES AND METHODS OF PRODUCING SAME

[75] Inventors: Warren Mang, Haddonfield, N.J.; Charles P. Marino, Philadelphia; Kevin P. Kray, Phoenixville, both of Pa.

[73] Assignee: Markel Corporation, Norristown, Pa.

[21] Appl. No.: 883,650

[22] Filed: May 15, 1992

Related U.S. Application Data

[63] Continuation-in-part of Ser. No. 568,280, Aug. 15, 1990, abandoned.

[51] Int. Cl.$^5$ .......................... F16C 1/10; H01B 7/00
[52] U.S. Cl. .................. 74/502.5; 74/500.5; 74/501.5 R; 174/110 PM
[58] Field of Search .................. 74/501.6, 502.6; 174/110 PM, 47, 60, 65 R, 121, 131

[56] References Cited

U.S. PATENT DOCUMENTS

| | | | |
|---|---|---|---|
| 2,576,227 | 11/1951 | Hutchins | 174/110 PM |
| 2,692,257 | 10/1954 | Zletz | 260/88.1 |
| 2,728,754 | 12/1955 | Evering et al. | 260/94.9 |
| 2,731,453 | 1/1956 | Field et al. | 260/88.1 |
| 2,929,744 | 3/1960 | Mathes et al. | 117/218 |
| 2,989,451 | 6/1961 | Proschaska | 204/154 |
| 3,086,242 | 4/1963 | Cook et al. | 18/1 |
| 3,303,243 | 2/1967 | Hughes et al. | 264/22 |
| 3,325,325 | 6/1967 | Ward | 174/110 PM |
| 3,362,897 | 1/1968 | Lawton | 204/159.2 |
| 3,370,112 | 9/1968 | Wray | 264/22 |
| 3,391,221 | 7/1968 | Gore et al. | 260/857 |
| 3,409,584 | 11/1968 | Buschman et al. | 260/41 |
| 3,434,501 | 3/1969 | Conrad | 138/109 |
| 3,448,182 | 6/1969 | Derbyshire et al. | 264/22 |
| 3,580,987 | 5/1971 | Opriarggia | 174/110 PM |
| 3,586,756 | 6/1971 | Garner | 174/110 PM |
| 3,629,489 | 12/1971 | Jachimowicz | 174/110 PM |
| 3,652,409 | 3/1972 | Mack et al. | 252/12 |
| 3,684,821 | 8/1972 | Miyauchi et al. | 174/110 PM |
| 3,749,817 | 7/1973 | Shiga et al. | 174/110 PM |
| 3,772,249 | 11/1973 | Morgans | 260/41 B |
| 3,816,643 | 6/1974 | Pechhold | 174/110 PM |
| 3,819,594 | 6/1974 | Holmes et al. | 260/87.5 A |
| 3,831,791 | 6/1975 | Schmidt | 174/110 PM |
| 3,840,694 | 10/1974 | Luczak | 174/110 PM |
| 3,908,704 | 9/1975 | Clement et al. | 138/22 |
| 3,930,419 | 1/1976 | Kramer | 74/501 |
| 4,026,863 | 5/1977 | Iseki et al. | 260/42.14 |

(List continued on next page.)

FOREIGN PATENT DOCUMENTS

0313416 4/1989 European Pat. Off. .
55-163310 6/1979 Japan .

OTHER PUBLICATIONS

"Polythene—The Technology and Uses of Ethylene Polymers," Wren, Frew and Morgan, 2nd. Ed., 1960, Chapter 12.

"Radiation Processing of Polyethylene," A. Barlow et al., Radiat. Phys. Chem., vol. 18, No. 1-2, pp. 267-280, 1981.

"Polyethylene for Electron Beam Cross-Linking," J. H. Bly, publication date, if any, unknown.

"Crosslinked Polymers," author and publication date unknown.

"Radiation Processing of Polyolefins and Compounds," A. Barlow et al., publication date, if any, unknown.

"Basic Concepts in Radiation Processing," Cleland, Ph.D., publication date, if any, unknown.

"Crosslinkable Industrial Polymers," Hollain, presented at Electron Beam Processing Symp. Sep. 22-23, 1980.

(List continued on next page.)

*Primary Examiner*—Vinh T. Luong
*Attorney, Agent, or Firm*—Synnestvedt & Lechner

[57] ABSTRACT

Disclosed is a flexible cable assembly for reliably transmitting motion along a predetermined path in high temperature environments. The assembly comprises a flexible tubular conduit, a crosslinked polyethylene tubular liner for the conduit and a core member movably contained within the conduit for transmitting force or torque along the predetermined path. The assembly preferably exhibits a fictional efficiency of at least about 80% over 500,000 cycles of the 200° F. S-test.

13 Claims, 1 Drawing Sheet

U.S. PATENT DOCUMENTS

| | | | |
|---|---|---|---|
| 4,052,911 | 10/1977 | Feldstein | 74/501 R |
| 4,112,708 | 9/1978 | Fukuda | 64/2 R |
| 4,118,532 | 10/1978 | Homsy | 428/294 |
| 4,139,576 | 2/1979 | Yoshimura et al. | 260/857 PA |
| 4,143,204 | 3/1979 | Fang | 428/413 |
| 4,226,823 | 10/1980 | Jansson et al. | 174/110 PM |
| 4,276,251 | 6/1981 | Bopp | 174/110 PM |
| 4,300,408 | 11/1981 | Yoshifuji | 74/501 R |
| 4,317,001 | 2/1982 | Silver et al. | 174/110 PM |
| 4,319,071 | 3/1982 | Schmidt | 174/110 PM |
| 4,362,069 | 12/1982 | Giatras et al. | 74/501 |
| 4,417,020 | 11/1983 | Bailey et al. | 524/502 |
| 4,451,616 | 5/1984 | Kawachi et al. | 525/178 |
| 4,541,303 | 9/1985 | Kuzunishi | 74/501 |
| 4,596,728 | 6/1986 | Yang et al. | 428/36 |
| 4,780,490 | 10/1988 | Mizuno et al. | 523/201 |
| 5,042,904 | 8/1991 | Story et al. | 174/110 PM |

OTHER PUBLICATIONS

"Radiation Processing of Insulation for Curing, Improved Properties," Berbecko, *Insulation/Circuits*, Feb. 1971.

"Heat-Recoverable Technology: Past, Present and Future," *IEEE Electrical Insulation Magazine*, Jul. 1987, vol. 3, No. 4.

"How Radiation Effects Plastics," Bohm et al., *SPE Journal*, Jul. 1971, vol. 27, pp. 21–25.

"Effect of Radiation on Polyethylene," V. L. Lanza, *Modern Plastics*, publication date unknown.

"Radiation Processing: The Industrial Applications of Radiation Chemistry," *Journal of Chemical Education*, vol. 58, pp. 168–173, Feb. 1981.

"Formulating Wire and Cable Grades of Polyethylene for Irradiation Crosslinking," Burns, presented at IEEE winter meeting, 1976.

"Structure, Properties and Wear Resistance of Polyethylene," Deanin et al., publication date, if any, unknown.

"Polyolefins for Wire and Cable," U.S.I. Chemicals, publication date unknown.

"Radiation Processing of Polyethylene," A. Barlow et al., *Radiat. Phys. Chem.*, vol. 14, pp. 783–796, 1979.

"Dose Distributions in Electron Irradiated Plastic Tubing," Miller et al., *Radiat. Phys. Chem.*, vol. 18, No. 5, pp. 967–973.

"Abrasion Resistant Anti-Friction Tubing in Push–Pull Cable Assemblies", Markel Corporation.

CABLE ASSEMBLIES AND METHODS OF PRODUCING SAME

This is a continuation-in-part of U.S. application Ser. No. 568,280, filed Aug. 15, 1990, abandoned.

This invention relates generally to cable assemblies, and more particularly to flexible cable assemblies of the type used in automobiles for transmitting rotary or linear motion along a predetermined path.

Motion transmitting cable assemblies are used in a large number of important commercial applications. Perhaps the most common use of such devices occurs in automotive, marine and aircraft installations. Although such cable assemblies are generally hidden from the view of the user, they nevertheless play an important role in many of these well-known modes of transportation. For example, many automobile accessories, such as heaters, air conditioners and side-view mirrors, are dependent upon such assemblies for convenient and reliable operation. Motion transmitting cable assemblies are also frequently indispensable components in the mechanisms used to control critical aspects of vehicle operation. For example, throttle cables and clutch cables are frequently used to control speed and power, respectively. It will be appreciated, therefore, that reliable operation of such devices over long periods of use is critical to the safety of present day automobiles. Furthermore, such assemblies are often exposed to high temperature environments and must be capable of transmitting the required actuating force over relatively long and serpentine paths, with minimal frictional drag; excessive frictional drag may cause extremely dangerous conditions, such as a non-responsive throttle control. Accordingly, the provision of cable assemblies which satisfy the above-noted objectives has long been a need in the automobile industry.

Generally, motion transmitting cable systems in common use today comprise a conduit and a motion transmitting core element movably disposed in the conduit. The conduit typically has fittings at each end thereof for attaching the cable assembly to a support structure. In one type of assembly, commonly referred to as a push-pull cable assembly, the cable core is both pushed and pulled to effect remote control of some servient mechanism, apparatus or device. When push-pull cable assemblies are operated in the push mode, the cable core is placed under a compressive load and a substantial lateral load is transmitted to the wall of the associated sheath or conduit. As a result, the side walls of the cable conduit or sheath are frequently subject to intermittent and potentially severe loading, depending upon the mode of operation. Another type of cable assembly is commonly referred to as a "pull-pull" cable assembly. In such assemblies, the core element is substantially always operated in tension, never in compression. While such assemblies do produce wear of the cable conduit and its liner, the wear is generally not as severe as with the push-pull type assemblies. In rotary type assemblies, the cable core is rotated in predetermined relation to an operating parameter, such as the speed of a motor vehicle. In such configurations, the conduit is also subject to abrasion as a result of contact with the rotating core.

Many materials have been suggested for use as conduit liners for motion transmitting cable assemblies. Because of its exceptional frictional characteristics and high resistance to wear, polymers of tetrafluoroethylene (PTFE), especially when filled with polyarylene sulfide, have enjoyed substantial commercial success and are generally the material of choice for the production of such liners. See, for example, U.S. Pat. No. 4,362,069. In part because of its low cost relative to PTFE, polyethylene has sometimes been suggested for use in the manufacture of conduits for motion transmitting cable assemblies. See, for example, U.S. Pat. Nos. 3,434,501 (Col. 3, lines 73-75), and 4,052,911 (Col. 3, lines 11-29). However, applicants have surprisingly found that the use of polyethylene as a conduit liner for motion transmitting cable assemblies has generally been less than satisfactory. In particular, applicants have found that the assemblies employing polyethylene-lined conduits generally have frictional efficiencies substantially below those found in cable assemblies having liners formed of polyarylene sulfide filled PTFE. As a result, polyethylene lined cable assemblies generally have more drag and are more difficult to operate than cable assemblies employing PTFE liners. More importantly, applicants have also found that cable assemblies using polyethylene liner are generally subject to catastrophic failure when operated in high temperature environments. As will be appreciated by those skilled in the art, bodily injury and even death can occur if such failures occur in cable assemblies used, for example, as throttle control linkages in automobiles or other equipment. On the other hand, while operational difficulties associated with polyethylene can generally be avoided by using PTFE liners, polyethylene is nevertheless an attractive material from a cost point of view. Thus, there has been a long-felt need for relatively low cost cable assemblies having operational advantages approaching those associated with PTFE-lined cable assemblies. This need has heretofore remained unfulfilled.

SUMMARY OF THE INVENTION

In view of the failures of the prior art and applicants' discovery of those failures, it is an object of the present invention to provide low cost cable assemblies which produce reliable and relatively low friction cable operation over long periods of use at high temperature conditions.

Applicants have discovered that these and other objects of the present invention are satisfied by cable assemblies comprising an elongated core for transmitting force or torque along a predetermined path and guide means comprising crosslinked polyolefin polymer for guiding the movement of the core member along the predetermined path. According to preferred embodiments of the present invention, the guide means includes a bearing surface comprising crosslinked polyolefin polymer for resisting abrasion of the guide means as said core moves along the predetermined path. Applicant has found that cable assemblies employing crosslinked polyolefin liners, and especially crosslinked polyethylene liners, provide results which are not only unexpected in view of the prior art, but which also differ in kind from the results produced by cable assemblies using uncrosslinked polyethylene liners. While applicants believe that the present invention is adaptable for use with chemically crosslinked polyolefin liners, it is preferred that crosslinking is provided, at least in part, by exposing the polyethylene to radiation, preferably in an amount from about 10 to about 30 megarads. According to a preferred aspect of the invention, the crosslinked polyolefin liners used in the present cable assemblies have an abrasion resistance of at least about 39,000 cycles of the 200° F. low-load S-test, and even more preferably exhibit a frictional efficiency of at least about 80% over 500,000 cycles of the 200° F. low-load S-test.

DETAILED DESCRIPTION OF PREFERRED EMBODIMENTS

Figure 1:
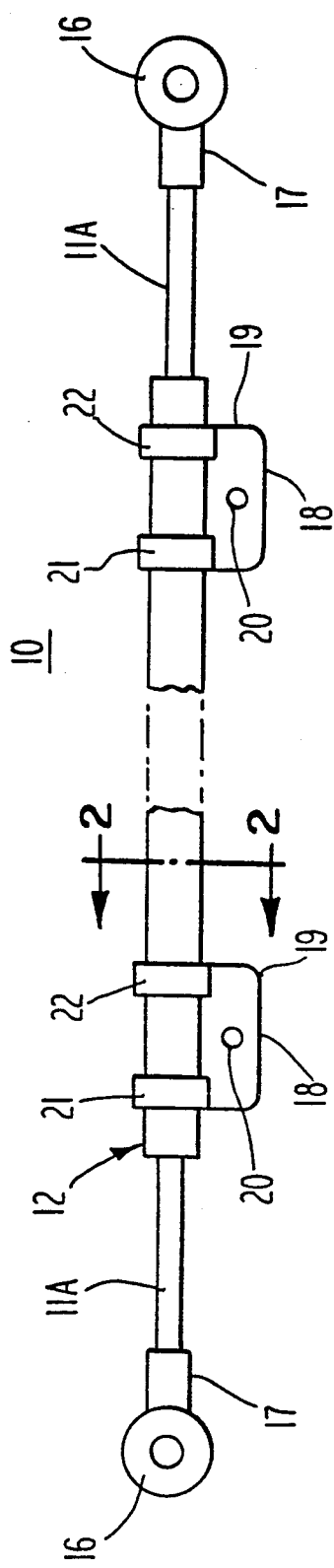
FIG. 1 is a semi-schematic representation of a cable assembly configuration according to one embodiment of the present invention.

The present invention provides cable assemblies adapted to transmit motion along a predetermined path between two remotely located points. The assemblies generally include a torque or force transmitting core member adapted to carry the torque or force along the predetermined path. The principal requirement of the core member is that it is of sufficient strength and durability to reliably withstand the various stresses and loads associated with the transmission of the force or torque. Many such motion-transmitting core members are well known in the art, and all are adaptable for use according to the present invention. According to preferred embodiments, the core is a braided steel wire or rope having a generally circular cross-section and a diameter of from about 50 mils to about 150 mils.

The present cable assemblies also comprise guide means for guiding the movement of the core member along the predetermined path. In order to obtain operative movement between the core and guide means, the cable assemblies of the present invention commonly require that a gap or clearance exist between the surface of the core and the guide means. It will be understood by those skilled in the art that the amount of gap or clearance which is provided any particular cable assembly configuration is a function of numerous variables, including the contemplated routing for the assembly, the type of motion the assembly will be used to transmit, and the extent of the load to be transmitted. Accordingly, all such gaps and clearances which permit the repetitive relative movement between the core and the guide means under the conditions of expected use are within the scope of the present invention.

According to an important and critical aspect of the present invention, the guide means preferably includes a bearing member having a low friction surface against which said core member bears as it transmits the force or torque along said predetermined path, said low friction surface being comprised of crosslinked polyolefin polymer. As will be appreciated by those skilled in the art, typical (uncrosslinked) polyolefin polymers, such as polyethylene, polypropylene, poly(1-butene), and poly(4-methylpentene), are comprised of polymer chains that are relatively linear and unbranched so that different polymer molecules or different parts of the same molecule are packed relatively close to one another. While applicants do not intend to be bound by or to any particular theory, it is generally accepted that such polyolefins are semi-crystalline materials containing both relatively unordered, i.e., amorphous, regions and relatively ordered, i.e., crystalline, regions. Although the polymer molecules in such typical (uncrosslinked) polyolefin material may be branched or intertwined, especially in the amorphous regions, the molecules are not generally joined to one another by covalent bonds. Because of the lack of inter-molecular bonding, uncrosslinked polyolefins generally become molten and moldable upon sufficient heating. This property is generally characteristic of molecular chains which are long and string-like, with little or no covalent bonding between molecules. Accordingly, uncrosslinked polyolefins are generally classified as semi-crystalline, thermoplastic resins. The crosslinked polyolefins of the present invention, on the other hand, are characterized as having sufficient covalent bonding between molecules to impart thermosetting properties to the material. That is, as the term is used herein, crosslinked polyolefin polymer refers to a polymer network having a degree of inter-molecular bonding sufficient to impart thermosetting characteristics to the polymer. As explained more fully hereinafter, crosslinked polyolefin polymers are preferably prepared by treating the above-mentioned uncrosslinked polymeric materials so as to increase inter-chain bonding.

While applicant believes that crosslinked polyolefin polymers may be generally adaptable for use according to the present invention, crosslinked polyethylene polymers are preferred. Numerous polyethylene resins having various characteristics and properties are commercially available and believed to be adaptable as raw materials for producing crosslinked polyethylene according to the present invention.

A preferred source of crosslinked polyolefin according to the present invention is derived from high density polyethylene (HDPE) material. As the term is used herein, HDPE refers to polyethylene having a density of greater than about 0.94 gram per cubic centimeter. The HDPE raw materials according to the present invention generally have weight average molecular weights of from about one hundred thousand to several million, with average molecular weights from about two million to about five million being preferred. Polyethylene material having weight average molecular weights on the order of $10^6$ are sometimes referred to as ultra-high molecular weight HDPE (UHMW-HDPE). It is contemplated that low density polyethylene, generally having densities ranging from about 0.91 to about 0.94 gram per cubic centimeter is also an acceptable starting material for the production of crosslinked polyethylene. Furthermore, it is believed that both linear and branched versions of polyethylene polymer are useful crosslinkable polyolefins according to the practice of the present invention.

While homopolymers, copolymers, block and graft copolymers of any of the above-mentioned types of polyolefins, and blends thereof, are contemplated as potentially acceptable sources of raw material for producing crosslinked polyolefin according to the present invention, it is preferred that the crosslinked polyolefin wear surface of the present invention be derived, at least in part, from HDPE homopolymer. Several processes are known and available for the production of HDPE homopolymers according to the present invention. One such process is known by those skilled in the art as the "Phillips process." This process consists essentially of feeding highly purified ethylene continuously into mechanically stirred reactors along with a suitable solvent and a small amount of finely divided catalysts, followed by catalyst removal, solvent removal and finishing of the polymer. The catalyst employed in the Phillips process is generally a solid, inorganic catalyst containing chromium in the CR (VI) state and a powdered substrate having a high surface area. Porous silica is typically used as the substrate for the catalyst in the Phillips process. Such porous silica catalysts are generally sold by Phillips Petroleum Company under the trademark "MARLEX." Another well-known process is the "Ziegler process." This process typically includes low pressure polymerization of ethylene in a low boiling hydrocarbon diluent in the presence of a catalyst comprising an activated metal-organic complex having the general restructure $Me(R)_n$, where Me is a metal, preferably selected from the group beryllium, aluminum, gallium and indium, and R comprises a radical, preferably an alkyl or aryl group. The third well-known method utilizes a promoted metal oxide catalyst, such as reduced molybdenum oxide, on a porous catalyst support, such as gamma aluminum, titanium, and zirconium. This process is described more fully in U.S. Pat. Nos. 2,728,754, 2,731,453, and 2,692,257, each of which is incorporated herein by reference. The preferred HDPE raw materials of the present invention have a melt-flow index of from about 0.1 to about 5.0 grams per ten minutes as measured by ASTM-D1238, with a melt-flow index of about 0.5 being even more preferred.

Methods for treating polyethylene to obtain crosslinking thereof are well known in the art, and all such methods are believed to be adaptable for use according to the present invention. For example, applicants believe that chemical crosslinking of polyolefins by the thermal dissociation of peroxide catalyst is an acceptable means for producing crosslinked polyethylene according to the present invention. Crosslinking may also be achieved by use of silane coupling assents. It is preferred, however, that the guide means of the present invention include a crosslinked polyethylene wear-surface wherein at least a portion of the crosslinking results from exposure of polyethylene to radiation from a suitable source. The radiation treatment of polyethylene to obtain crosslinking thereof is well known to those skilled in the art. Thus, it is known that protons, neutrons, alpha particles, high energy electron beams, x-rays and gamma rays are all acceptable sources of radiation for producing crosslinked polyethylene. Each of these sources of radiation interacts with the initially separate polyethylene molecules and provides sufficient energy to initiate chemical bonding therebetween. The degree of crosslinking which is desired in any particular application will be a function of a large number of variables, including the raw material being used, the temperature and stress conditions under which the liner will be employed, the particular configuration of the cable assembly, the material of construction of the core member, the thickness of the crosslinked polyethylene wear-layer and the like. It is believed that, in view of the present disclosure, one of ordinary skill in the art will be capable of readily determining, without undue experimentation, the degree of crosslinking desired for any particular application.

As is well understood by those skilled in the art, the degree of polymer crosslinking due to irradiation is largely a function of the radiation flux, that is, the amount of energy absorbed per unit mass of the absorber. Applicants have found that when HDPE is the material being crosslinked, the polymer resin is preferably crosslinked by exposure to from about 10 to about 30 megarads of radiation, and that the source of radiation is an electron beam. As is well known and understood by those skilled in the art, a rad is defined as an energy absorption of 100 ergs per gram, and thus, a megarad is equivalent to an energy absorption of $10^8$ ergs per gram. The mechanisms for producing and the properties of crosslinked polyethylene, and especially crosslinked polyethylene produced as a result of radiation treatment, are described extensively in Chapter 12 of "Polyethylene—The Technology and Uses of Ethylene Polymers"; Wren, Frew and Morgan, 2nd. Ed. 1960.

The uncrosslinked polyolefin raw materials of the present invention preferably include a crosslinking promoter to enhance the extent of intermolecular bonding. A large number of crosslinking promoters or agents are known to those skilled in the art and all are believed to be within the scope of the present invention. Crosslinking promoters are preferably selected from the group consisting of acrylates, methacrylates and mixtures of these. Thus, trimethylolpropane trimethacrylate and 1,4 butanediol diacrylate are preferred crosslinking promoters.

According to a preferred embodiment of the present invention, the crosslinked polyethylene bearing surface is provided by extrusion of polyethylene resin into a tubular form which is utilized as a conduit liner in the cable assembly. One important aspect of the present invention relates to the wall thickness of the present tubular liners. Motion transmitting cable assemblies are frequently used in applications requiring high flexibility and low weight. Accordingly, it is preferred that the tubular liners of the present invention be thin walled tubular liners having a wall thickness of less than about 0.05 inch, and even more preferably less than about 0.02 inch. Such thin walled tubular liners provide a relatively thin wear-layer, and as such it is especially critical that these liners posses the exceptional abrasion resistance and frictional characteristics of the crosslinked polyethylene products of the present invention.

Since irradiation of polyolefins generally imparts a thermosetting characteristic to the present materials, it is highly preferred that crosslinking by irradiation of the polymeric materials be achieved after the polyolefin has been extruded into the proper shape and cooled. Thus, according to the method aspects of the present invention, cable assemblies are formed by extruding an uncrosslinked polyolefin polymer, and preferably polyethylene, into the desired shape, then exposing the extruded product to an amount of radiation effective to crosslink the polymer molecules and then providing such crosslinked polyolefin tubular product as a guide surface in a cable assembly.

The present invention will now be described below in connection with a cable assembly adapted for transmitting motion in a longitudinal direction. It will be appreciated by those skilled in the art, of course, that such embodiments are illustrative only and are not limiting of the present invention. For example, cable assemblies according to the present invention are readily adaptable for transmitting rotary motion along a predetermined path.

Figure 2:
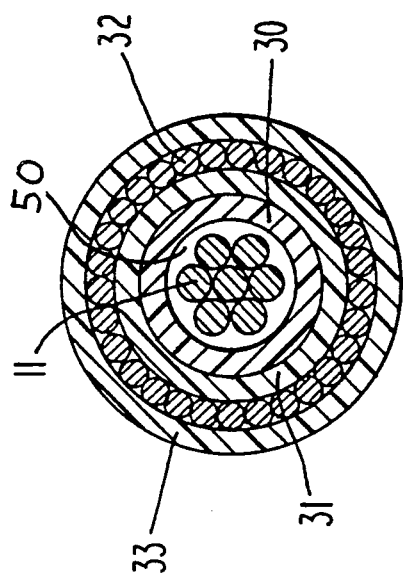
FIG. 2 is a cross-sectional view taken along lines 2—2 of the cable assembly configuration shown in FIG. 1.

Referring now to FIGS. 1 and 2, a typical push-pull or pull-pull cable assembly configuration is illustrated. The cable assembly, indicated generally at 10, comprises a motion transmitting core 11 surrounded by guide means in the form of a casing or conduit, indicated generally at 12, for guiding the motion of core 11 along its predetermined path. According to the embodiment shown in FIG. 2, core 11 may consist of a braided strand of wire cable of the type shown in U.S. Pat. No. 4,362,069. Other configurations of core 11 are possible and within the scope of the present invention.

With particular reference now to FIG. 1, the core 11 is seen as including an end portion 11A which projects lengthwise beyond the end of the casing 12. The length of the projecting end portion 11A of core 11 depends upon the lengthwise sliding movement of the core with respect to casing 12. In typical configurations, the cable assembly 10 is adapted to operatively connect an actuating device, such as an accelerator pedal (not shown), and an operable mechanism, such as an automobile carburetor control mechanism (also not shown). Means in the form of a pair of eyelet members, designated generally as 16, are provided on the ends 11A of the core 11 for operatively connecting the cable assembly 10 between the actuator and its associated device. Each of the eyelets 16 comprises a generally ring-shaped connecting section and a hollow, sleeve-like mounting section 17 adapted to receive the ends of the core 11A and be secured thereto by crimping or the like. The casing 12 is provided with means for fixedly securing the cable assembly 10 in a predetermined operative position. According to the embodiment shown in FIG. 1, such means is provided by a suitable support bracket 18 comprising a generally flat mounting section 19 having an opening 20 adapted to receive a suitable mounting bolt or the like (not shown). Integrally connected to one edge of the bracket 19 is a pair of tab-like elements 21 and 22 secured to outer casing 12.

The configuration of conduit 12 will now be described in more detail in connection with FIG. 2. The conduit 12 is a multi-layered tubular conduit comprising crosslinked polyethylene liner 30 immediately surrounding core 11. As clearly illustrated in FIG. 2, a gap or clearance 50 exists between liner 30 and the enclosed core 11. As mentioned hereinbefore, the particular gap employed in any cable assembly configuration will vary widely, depending upon numerous factors and constraints not related to the present invention. For cable assemblies of the general type illustrated in FIGS. 1 and 2, however, it is generally preferred that the gap or clearance will be from about 0.5 mil to about 20 mil, with a gap from about 3 mil to about 15 mil being even more preferred. It will be appreciated by those skilled in the art that the gap 50 will not necessarily be a constant and uniform spacing along the entire length of the cable assembly, especially cable assemblies used in serpentine routings. Accordingly, the term "gap" is generally used herein to define the distance between the outer surface of the core and the inner surface of the guide means based upon the relative dimensions of those elements.

An inner wrap 31 surrounds the liner 30. Inner wrap 31 may comprise a closed wrapping of flat wire or a plastic tubular sheath surrounding liner 30. As is known to those skilled in the art, a primary purpose of the inner wrap 31 is to aid in maintenance and control of the shape and dimension of liner 30. According to the embodiment shown in FIG. 2, a full compliment of lay wire 32 surrounds inner wrap 31. As will be appreciated by those skilled in the art, the use of a full compliment of lay wire provides added resistance to axial compressive load deflection. Of course, the lay wire may be spaced or even omitted when such axial load deflection resistance is not an important requirement, such as may be the case in certain pull-pull type cable assemblies. In certain other embodiments, an outer wrap of flat wire or other material (not shown) may encircle the lay wire, as is understood by those skilled in the art. An outer jacket 33 encases the lay wire 32. The outer jacket 33 preferably comprises a material which provides water leak resistance to the cable conduit, such as polypropylene.

As will be appreciated by those skilled in the art, conduit 12 provides means for guiding the movement of core member 11 along the selected predetermined path. The crosslinked polyethylene liner 30 provides the conduit 12 with a low friction bearing surface against which said core member bears as it moves along its predetermined path. As mentioned above and explained more fully hereinafter, the formation of conduit 30 from crosslinked polyethylene material provides an abrasion-resistant, low-friction surface which allows efficient and reliable operation of the cable assembly 10. while the motion transmittinq core member 11 is generally movably contained within tubular liner 30, it is possible that alternative configurations may be employed. For example, the combination of core 11 and liner 30 may be modified such that the liner is fixedly mounted to the core. In such embodiments, the liner 30 acts as a protective covering for the core which moves as the core moves along the predetermined path. That is, the liner 30 constitutes an element of the guide means which provides a crosslinked polyolefin bearing surface for resisting abrasion of the guide means as said core moves along the predetermined path.

According to the preferred configuration shown in FIG. 2, the crosslinked polyethylene liner 30 is provided in a generally circular cross-section. It will be appreciated by those skilled in the art, however, that other configurations of the crosslinked polyethylene liner are available and within the scope of a present invention. For example, the liner 30 may comprise a tubular member having a plurality of convolutions which facilitate bending and longitudinal compression thereof, as disclosed in U.S Pat. No. 3,930,419. Furthermore, cable assemblies of the type disclosed in U.S. Pat. No. 4,112,708 have tubular liners formed with numerous cross-sectional configurations. All such variations are within the scope of the present invention.

The following examples, set forth by way of illustration but not limitation, depict the improved and unexpected results achievable by the present cable assemblies which utilize a guide means having a crosslinked polyethylene wear-surface. In each of the examples which follow, the performance of a liner for a pull-pull type cable assembly was evaluated using what is referred to herein as a "S-test." This test is conducted using a routed over an "S" shaped fixture wherein the curvilinear portions of the inner radii of the "S" fixture extend about 120° F. A 7×7 stranded and swedged stainless steel core member having a diameter of about 62 mils is drawn through the tubular liner in a reciprocating manner at a rate of about 60 cycles per minute. The liner has an inner diameter of about 98 mils and an outer diameter of about 120 mils. Thus, a gap of about 18 mils exists between the core and the liner. A silicone-based oil is provided as a lubricant in the core, as is common. Each S-test cycle consists of a forward travel of about one and one-half inches and a like return. Frictional efficiency and abrasion resistance are determined by applying an operating load to one end of the core member of the cable assembly as it travels along the S-shaped path. The operating load is applied by either a spring or a weight. Frictional efficiency measurements are taken at various intervals of cycles by employing a load cell (transducer) and recording the actual load necessary to move the cable over the surface of the liner at four cycles per minute. For the actual measurement, the operating load is replaced by a five pound dead weight. The frictional efficiency is calculated as a percentage by dividing the measured force into the five pound dead weight.

When the spring is the operating load, it exerts about 6 pounds of force in the fully retracted position of the S-test cycle and about 18 pounds of force in the fully expanded position of the S-test cycle. For the purposes of convenience, the term "low load frictional efficiency" refers to a frictional efficiency determined using a spring of the type described above. In an alternative test, the spring is replaced by a 25 pound dead weight. As the term is used herein, "high-load frictional efficiency" refers to a frictional efficiency determined using the 25 pound weight. The S-test apparatus is adapted to be operated under both ambient conditions and at conditions of elevated temperature. For the purposes of convenience, an S-test according to the procedures described above which is conducted under ambient conditions is referred to herein as an ambient S-test. When an S-test according to the procedures described above is conducted at elevated temperature conditions, the temperature is reflected in the description of the S-test. Thus, when the test is conducted at temperature of 200° F. with the 6-18 spring, the test is referred to herein as a low load 200° F. S-test. In the test results, the letter "F" following a given calculated efficiency at a given number of cycles indicates a failure of the liner, i.e., a wearing through of the liner by the cable. Such a failure is determined by the cable contacting a base metal after wear through and closing the electrical circuit which stops the tester.

According to preferred embodiments, the present liners exhibit exceptional abrasion resistance and frictional efficiency, especially under high temperature conditions. While it is contemplated that all such levels of abrasion resistance and frictional efficiency are within the scope of the present invention, it is generally preferred that the cable assemblies of the present invention include a liner which is capable of withstanding, that is, has an abrasion tolerance of at least about 39,000 cycles of the 200° F. low-load S-test. It is also preferred that the cable assemblies comprise a liner having a frictional efficiency of at least about 80% after 500,000 cycles of the 200° F. low-load S-test, and even more preferably after 500,000 cycles of the 200° F. high-load S-test. According to certain embodiments, it is preferred that the cable assemblies include a liner having a frictional efficiency of greater than about 90% after 500,000 cycles of the 200° F. low-load S-test, and even more preferably, after 500,000 cycles of the 200° F. high-load S-test.

COMPARATIVE EXAMPLE 1

A high load ambient S-test was conducted to establish the frictional efficiency, under high loads and at room temperature, of a cable assembly having a polyethylene conduit not treated by crosslinking according to the present invention. About 97 parts by weight of a high density polyethylene resin in pellet form having a density of about 0.947 g/cm³ sold by USI Chemicals under the trade designation LR-580 was admixed with about 6 parts by weight of trimethylolpropane trimethacrylate sold by the Sartomer Company under the trade designation SR-350 to produce a homogeneous preblend. About 97 parts by weight of a high density polyethylene resin in powdered form having a density of about 0.947 g/cm³ sold by USI Chemicals under the trade designation MA-795 was admixed with about 103 parts by weight of the preblend to form a homogeneous blend of particulate resin, powdered resin and crosslinking promoter. This blend was hot-melt extruded into an elongate, solid rod. After cooling, the elongate rod was finely divided to produce rod-shaped pellets of the resin blend. These pellets were then hot-melt extruded into a tubular product having an inside diameter of 0.098 inches (0.025 mm) and an outside diameter of about 0.118 inches (0.03 mm). The tubular product thus formed had a wall thickness of about 0.02 inches and was subjected to the high load, ambient S-test, as described above.

The initial frictional efficiency of the assembly using the uncrossed-linked polyethylene liner (liner A in Table I) was found to be 90.5%. The frictional efficiency was found to decline essentially steadily, as indicated in Table I, until the frictional efficiency at 500,000 cycles of the high load ambient S-test was found to be 81.5%.

EXAMPLE 1

A high load ambient S-test was performed to show the improved frictional efficiency of cable assemblies having crosslinked polyethylene liners according to the present invention. The pelletized resin blend described in Comparative Example 1 was hot-melt extruded to produce a tubular product having an inside diameter of 0.099 inches (0.025 mm) and an outside diameter of 0.121 inches (0.031 mm). The tubular product was exposed to 20 megarads of radiation from a high intensity electron beam to produce a crosslinked polyethylene tubular product. The tubular product (liner B in Table I) was subject to the high load, ambient S-test, as described in Comparative Example 1. The initial frictional efficiency was found to be 91%, a modest increase over the initial frictional efficiency of the liner tested in Comparative Example 1. Surprisingly, and more importantly, the frictional efficiency actually increased to 92.5% during a significant portion of the test, as revealed in Table I, and after 500,000 cycles of operation was 91%, substantially greater than the frictional efficiency of the assembly using the unirradiated polyethylene liner.

COMPARATIVE EXAMPLE 2

A low-load 200° F. S-test was conducted to establish the catastrophic failure which occurs in cable assemblies employing unirradiated polyethylene liner at high temperature, even under relatively moderate load conditions. The pelletized resin blend described in Comparative Example 1 was hot-melt extruded to produce a tubular product having an inside diameter of 0.098 inches (0.025 mm) and an outside diameter of 0.118 inches (0.030 mm). The tubular product was subject to an S-test in which a 6-18 pound spring was attached to one end of the motion transmitting core member. The test was conducted at an elevated temperature of about 200° F. The frictional efficiency of the product (liner C in Table II) was initially 84.5%. The liner experienced catastrophic failure at 38,600 cycles of the S-test due to wear-through.

EXAMPLE 2

A low-load, 200° F. S-test was performed to show the improved frictional efficiency and wear resistance of cable assemblies under low-load, high temperature conditions wherein such assemblies employ crosslinked polyethylene liners. The pelletized resin blend described in Comparative Example 1 was hot-melt extruded to produce a tubular product having an inside diameter of 0.103 inches (0.026 mm) and an outside diameter of 0.125 inches (0.032 mm). The tubular product was exposed to 20 megarads of radiation as in Example 1 and subject to a high load S-test as described in Comparative Example 2. The initial frictional efficiency of the product (liner D in Table II) was found to be 85%. In stark contrast to the catastrophic failure exhibited by the cable assembly of Comparative Example 2, however, the cable assembly having the irradiated polyethylene liner operated through 500,000 cycles of operation with only a nominal loss of frictional efficiency, as illustrated in Table II. In particular, the frictional efficiency at 500,000 cycles of the high load, 200° F. S-test was found to be about 83.5%.

COMPARATIVE EXAMPLE 3

A high-load 200° F. S-test was conducted to establish the catastrophic failure which occurs in cable assemblies employing unirradiated polyethylene liner at high temperature under relatively severe loading conditions. The pelletized resin blend described in Comparative Example 1 was hot-melt extruded to produce a tubular product having an inside diameter of 0.098 inches (0.025 mm) and an outside diameter of 0.118 inches (0.030 mm). The tubular product was subject to an S-test in which a 25 pound dead weight was attached to one end of the motion transmitting core member. The test was conducted at an elevated temperature of about 200° F. The frictional efficiency of the liner (liner E in Table II), which was initially 84.5%, deteriorated so rapidly that the hooks which attach the core member to the testing weight were unable to withstand the increase in frictional drag and therefore broke off at about 38,600 cycles. The frictional efficiency just prior to breaking of the tester was measured to be 32%. This example amply illustrates the potential for catastrophic failure associated with the use of unirradiated polyethylene for tubular liner in cable assemblies exposed to high temperature conditions.

EXAMPLE 3

A high-load, 200° F. S-test was performed to show the improved frictional efficiency and wear resistance of cable assemblies under high-load, high temperature conditions wherein such assemblies employ crosslinked polyethylene liners. The pelletized resin blend described in Comparative Example 1 was hot-melt extruded to produce a tubular product having an inside diameter of 0.103 inches (0.026 mm) and an outside diameter of 0.125 inches (0.032 mm). The tubular product (liner F in Table II) was irradiated as in Example 1 and was subject to a high-load S-test as described in Comparative Example 3. The initial frictional efficiency was found to be 84.5%. In stark contrast to the catastrophic failure exhibited by the assembly of Comparative Example 3, however, the cable assembly having the irradiated polyethylene liner operated through 500,000 cycles of operation with only a nominal loss of frictional efficiency, as illustrated in Table II. In particular, the frictional efficiency at 500,000 cycles of the high load, 200° F. S-test was found to be about 80%.

It will be appreciated by those skilled in the art that the preferred embodiments disclosed herein are illustrative of the present invention but not limiting thereof. Accordingly, modifications of the disclosed embodiments are possible without departing from the proper scope of the present invention, which is defined by the claims which follow.

TABLE I

| | | | LIFE CYCLE S-TEST DATA | | | | | | |
|---|---|---|---|---|---|---|---|---|---|
| Liner | Test Temp °F. | Loading | Initial Efficiency | Cycles (Thousands) | | | | | |
| | | | | 92 | 160 | 255 | 338 | 425 | 560 |
| A | RT | High | 90.5 | 86.5 | 86.0 | 84.5 | 85.0 | 83.5 | 81.5 |
| B | RT | High | 91.0 | 92.5 | 92.5 | 92.5 | 92.5 | 92.0 | 91.0 |

TABLE II

| | | | LIFE CYCLE S-TEST DATA | | | | | |
|---|---|---|---|---|---|---|---|---|
| Liner | Test Temp °F. | Loading | Initial Efficiency | Cycles (Thousands) | | | | |
| | | | | 125 | 230 | 325 | 450 | 500 |
| C | 200 | Low | 84.5F* | | | | | |
| D | 200 | Low | 85.0 | 85.0 | 84.0 | 83.5 | 84.5 | 83.5 |
| E | 200 | High | 84.5F** | | | | | |
| F | 200 | High | 84.5 | 82.0 | 81.5 | 80.5 | 80.5 | 78.5 |

*wear through at 32,600 cycles
**testing apparatus broke with efficiency at 32% after 38,600 cycles

What is claimed is:

1. A flexible cable assembly for transmitting motion along a predetermined path, including in high temperature environments, said cable assembly comprising a flexible tubular conduit and a motion transmitting core member movably contained within said conduit for transmitting force or torque along said predetermined path, said tubular conduit comprising a crosslinked polyethylene tubular liner against which said core bears as it transmits said force or torque, said tubular liner having a wall thickness of less than about 0.05 inch and having an abrasion resistance of at least about 39,000 cycles of the 200° F. low-load S-test.

2. The flexible cable assembly of claim 1 wherein said core member comprises a braided wire cable.

3. The flexible cable assembly of claim 1 wherein said tubular liner is an extruded liner comprising crosslinked high density polyethylene resin having a density of at least about 0.94.

4. The cable assembly of claim 1 wherein the density of said polyethylene is from about 0.91 to about 0.94.

5. The cable assembly of claim 3 wherein the average molecular weight of the said polyethylene is from about two million to about five million.

6. The cable assembly of claim 3 wherein said crosslinked polyethylene is an electron beam irradiated polyethylene.

7. A flexible cable assembly for transmitting motion along a predetermined path, including in high temperature environments, said cable assembly comprising a flexible tubular conduit having an inner surface, a motion transmitting core member movably contained within said conduit for transmitting force or torque along said predetermined path, the inner surface of said conduit comprising a tubular liner comprising crosslinked polyethylene, said tubular liner having a wall thickness of less than about 0.05 inch and exhibiting a frictional efficiency of at least about 80% over 500,000 cycles of the 200° F. S-test.

8. The cable assembly of claim 7 wherein said core member comprises a braided wire cable.

9. The cable assembly of claim 7 wherein said tubular liner is an extruded liner comprising crosslinked high density polyethylene resin having a density of at least about 0.94.

10. The cable assembly of claim 7 wherein the density of said polyethylene is from about two million to about five million.

11. The cable assembly of claim 7 wherein the average molecular weight of said polyethylene is from about two million to about five million.

12. The cable assembly of claim 11 wherein said crosslinked polyethylene is an electron beam irradiated polyethylene.

13. The cable assembly of claim 7 wherein said liner has a wall thickness of about 0.02 inch.

* * * * *